United States Patent
Schenkel et al.

(10) Patent No.: US 6,872,269 B2
(45) Date of Patent: Mar. 29, 2005

(54) PROCESS FOR BONDING CONTAMINATED SUBSTRATES

(75) Inventors: Hubert Schenkel, Sandhausen (DE); Juergen Von Czarnecki, Berglern (DE); Matthias Von Hayek-Boelingen, München (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 10/804,680

(22) Filed: Mar. 19, 2004

(65) Prior Publication Data

US 2005/0000619 A1 Jan. 6, 2005

(30) Foreign Application Priority Data

Mar. 22, 2003 (DE) .......................... 103 12 815

(51) Int. Cl.[7] .............................................. B32B 31/00
(52) U.S. Cl. ..................... 156/73.1; 156/73.6; 156/281; 156/307.3
(58) Field of Search ............................. 156/73.1, 73.5, 156/73.6, 281, 307.1, 307.3, 580.1, 580.2; 264/442, 443, 444, 445; 425/174.2

(56) References Cited

U.S. PATENT DOCUMENTS

| | | | |
|---|---|---|---|
| 4,732,633 A | * | 3/1988 | Pokorny ...................... 156/94 |
| 4,824,500 A | * | 4/1989 | White et al. .................. 156/94 |
| 4,905,530 A | | 3/1990 | Stehle et al. |
| 5,084,532 A | | 1/1992 | Schenkel |
| 5,259,908 A | | 11/1993 | Buecken et al. |
| 5,582,858 A | * | 12/1996 | Adamopoulos et al. ...... 156/281 |
| 6,004,425 A | | 12/1999 | Born et al. |
| 6,015,865 A | | 1/2000 | Blank et al. |
| 6,361,643 B2 | | 3/2002 | Born et al. |
| 6,448,338 B1 | | 9/2002 | Born et al. |
| 2003/0187154 A1 | | 10/2003 | Schoenfeld et al. |

FOREIGN PATENT DOCUMENTS

| | | |
|---|---|---|
| CA | 2 346 634 A1 | 4/2000 |
| CA | 2 355 611 A1 | 6/2000 |
| CA | 2 000 569 | 5/2001 |
| EP | 0 369 165 A1 | 5/1990 |
| EP | 0 365 715 B1 | 6/1993 |
| EP | 0 363 892 B1 | 8/1993 |
| EP | 0 354 498 B1 | 10/1999 |
| WO | WO 93/00381 A1 | 1/1993 |
| WO | WO 96/16136 A1 | 5/1996 |
| WO | WO 96/23040 A1 | 8/1996 |
| WO | WO99/03946 A1 | 1/1999 |
| WO | WO 00/20483 A2 | 4/2000 |
| WO | WO 00/37554 A1 | 6/2000 |
| WO | WO 01/94492 A1 | 12/2001 |

* cited by examiner

Primary Examiner—James Sells
(74) Attorney, Agent, or Firm—Stephen D. Harper

(57) ABSTRACT

The introduction of vibration energy such as ultrasound into an uncured adhesive matrix during and/or after the joining of substrates leads to the effective dissolution and/or dispersion of adhesion-reducing contamination of the substrate surfaces into the adhesive matrix. In many cases, this can reduce the cost of expensive cleaning processes or quality control measures.

16 Claims, 2 Drawing Sheets

PROCESS FOR BONDING CONTAMINATED SUBSTRATES

This application claims priority under the Paris Convention and U.S.C Section 119 from German Application DE 10312815.8, filed Mar. 22, 2003.

FIELD OF THE INVENTION

This invention relates to a process for bonding contaminated substrates, more particularly for bonding contaminated substrates using reactive adhesives.

DISCUSSION OF THE RELATED ART

In modern production methods for joining metallic components in machine, vehicle or equipment manufacture, more particularly in car production, conventional fixing techniques, such as riveting, screwing or welding, are being increasingly replaced by bonding. The interest in bonding derives from its various advantages in the field of lightweight construction and from the possibility it affords of being able to join materials of different kinds to one another.

In car production, adhesives, more particularly high-strength structural adhesives, are being increasingly used at the white body stage, i.e., the adhesives are often applied to uncleaned metal surfaces, for production reasons. These uncleaned surfaces are generally coated with various anti-corrosion or drawing greases or oils. In addition, not only metallic substrates, but also plastic modules that have to be bonded to metallic components are used in modern lightweight construction. These plastic parts often contain mold release agents or parting agents on their surfaces. Similar difficulties with surface contamination are also typical of the entire repair sector. This surface contamination of the substrates to be bonded consists entirely of nonpolar compounds with poor cohesive strength, so that it can have an adhesion-reducing effect on the bonded joint, particularly after ageing.

The strength and ageing resistance of a bonded joint are influenced not only by the strength and ageing resistance of the adhesive matrix per se, but also critically by the adhesion in the boundary layer between adhesive and substrate.

The development of permanent adhesion of the adhesive to the substrate surface depends on the functional groups of the adhesive and the substrate surface being able to enter into a permanent bond with one another or to interact extensively with one another. Even contamination in the form of monolayer adsorbates on the substrate surface can affect or reduce the non-positive interaction on the load-bearing substrate and can thus lead to adhesion failure and to poor ageing behavior of the adhesive joint. This applies in particular to two-component adhesives curing at room temperature.

In order to be able to produce high-strength, durable adhesive joints reliably protected against ageing, very elaborate cleaning and surface pretreatment processes are often used in the prior art. For example, the parts are pretreated with organic solvents or water-based cleaning and degreasing preparations. This can be done either by spray application or in immersion baths; occasionally, these cleaning processes are supported by the use of ultrasonication baths. In addition, it is common practice to prepare the surfaces for bonding by subjecting them to additional physical and chemical pretreatments. Physical pretreatment processes include abrading and blasting with abrasive materials (for example sandblasting, cryoblasting). Chemical processes include plasma, pickling and anodizing pretreatments. However, all pretreatment processes involve the risk of adhesion-reducing contaminants remaining on the substrate surface.

Since such elaborate processes are very expensive, they are hardly used, for example, in machine construction or in car production or in the construction of other land vehicles and marine craft. Even in the bonding processes used in aircraft and space vehicles, where such expenditure on cleaning and surface pretreatment is unavoidable, the tendency to go wrong attributable to adhesion-reducing contaminants remaining uncontrollably on the substrate surfaces is unresolved. In practice, therefore, two different paths—neither entirely satisfactory—have hitherto been followed:

Where it is absolutely essential and where cost pressure for the production steps is not prohibitive, as for example in the aircraft industry and the space industry, expensive cleaning and pretreatment processes are used to create a defined and, where possible, uncontaminated or substantially uncontaminated substrate surface.

In the automotive industry where cost pressure is far higher and the numbers are far greater, the problem is tentatively solved by the use of contamination-tolerant adhesive compositions. The adhesives in question are generally cured by heating at +150° to +180° C. and, due to the far higher diffusion rate at such temperatures, contamination can be taken up into the adhesive.

The latter path has already been successful to a considerable degree, more particularly for heat-curing adhesive compositions based on reactive rubbers. Corresponding rubber-based heat-curing adhesive compositions are described, for example, in the following documents: WO 99/03946, WO 96/16136, WO 96/23040, EP 363892, EP 369165, and EP 365715.

Examples of contamination-tolerant heat-curing epoxy adhesives can be found in the following documents: WO 01/94492, WO 00/37554, WO 00/20483, WO 93/00381, and EP 354498.

Hot-curing adhesives of the type in question are even capable of bonding oil-coated steel plates with an oil coating of up to 3 g/$M^2$ oil. The contamination tolerance is attributable not only to the adhesive formulation, but also to the diffusion of nonpolar contamination constituents into the adhesive at the high curing temperature of 150° C. to 180° C. The composition of the adhesives enables the time window, in which contaminants are also able to diffuse from the interface into the adhesive matrix after the exposure to heat, to be influenced to a limited extent. However, when the curing process of the adhesive has advanced further, such diffusion of the contaminating material into the adhesive matrix is greatly impeded or totally suppressed. For the majority of cold-curing adhesives, which are generally two-component or one-component moisture-curing systems, this form of contamination tolerance of the adhesive composition is of no use because the diffusion process at room temperature is still unable to make any significant contribution to the removal of the contaminating products from the interface. This inhibition of the diffusion process is particularly pronounced because, for example, two-component adhesive systems are generally formulated so that they begin to crosslink at low temperatures and thus impede the diffusion processes of the contaminating materials away from the interface; on the other hand, the diffusion rate at room temperature is very slow. Accordingly, the quality and ageing resistance of the bonds of contaminated substrate surfaces are, in general, correspondingly unsatisfactory where two-component adhesive systems and other adhesive systems curing at room temperature are used. Another obstacle to diffusion processes is the thixotropic nature of most adhesives.

Accordingly, the problem addressed by the present invention was to provide a process for bonding contaminated substrates which would avoid expensive cleaning and pretreatment steps before application of the adhesive to the substrate surface and which would guarantee adequate bond quality, even in the presence of unavoidable contamination or recontamination.

In the prior art, substrate pretreatment is left to mechanical, physical or chemical pretreatment steps. These are followed by the bonding process. According to the present invention, it is new and much more effective to couple the process step crucial to the strength of the bonded joint directly with application of the adhesive and hence safely to preclude recontamination of the substrates.

SUMMARY OF THE INVENTION

The present invention provides a process for bonding contaminated substrates in which the contaminating constituents of the substrate surfaces are removed from the interface and are dissolved or dispersed in the adhesive matrix, so that surface wetting is improved, by the introduction of vibration energy/ultrasound into the uncured adhesive matrix.

DETAILED DESCRIPTION OF CERTAIN EMBODIMENTS OF THE INVENTION

Figure 2:
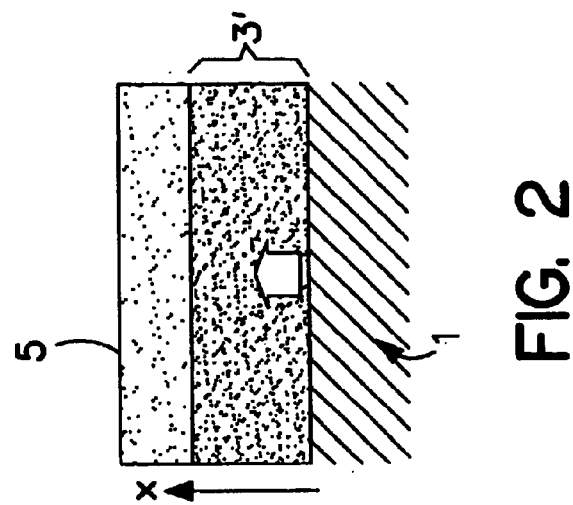
FIG. 2 shows a detail of the interface between a substrate and the adhesive matrix on an enlarged scale.

In one embodiment, the process according to the invention comprises the following steps:
a) applying the adhesive composition to at least one contaminated substrate surface to be joined;
b) applying the second, possibly likewise contaminated substrate to the adhesive-coated substrate;
c) introducing vibration energy into the uncured bonded joint; and
d) curing the adhesive.

In another embodiment, the adhesive composition is applied to one of the contaminated substrate surfaces while vibration energy is introduced. In this case, the vibration energy is introduced via the uncured adhesive as a coupling medium, so that the dispersing energy is effectively brought to the contaminated substrate interface; the contaminating material can be dispersed or dissolved and transported into the adhesive matrix by the vibration energy.

In principle, the vibration energy can be introduced in the form of low-frequency vibration. However, a particularly preferred embodiment is characterized by the use of ultrasonic energy in the frequency range above the range of human hearing and below 10 MHz and more particularly in the range from 20 to 100 kHz.

The vibration energy can be introduced by fitting a sound head or so-called sonotrode to at least one of the substrates.

In another embodiment, the vibration energy is introduced directly during application of the adhesive immediately after the adhesive has been applied to the substrate surface. In this embodiment, the sound head may be directly coupled to the adhesive applicator or is guided over the application zone immediately after the adhesive applicator. The second substrate is applied to the adhesive surface after application of the adhesive and introduction of the vibration energy. This procedure is particularly suitable for application in cases where only one of the substrates is significantly contaminated.

Both where the vibration energy is introduced after the substrates have been fitted together and where application of the adhesive and introduction of the vibration energy are coupled, the sound head or the combination of sound head and adhesive applicator can be guided by machine along the bonded joint. In a preferred embodiment, this mechanical guiding is carried out by program-controlled robots known in the art.

The diffusion, dissolution and/or dispersion of the contaminants on the substrate surface in the adhesive matrix can be further promoted if the adhesive has a temperature above the ambient temperature during application and/or during introduction of the vibration energy. In a preferred embodiment, this elevated temperature may be between 25° C. and 90° C. and, in a particularly preferred embodiment, is between 35° C. and 70° C.

The process according to the invention of dispersing/dissolving the contaminating products away from the substrate surface into the adhesive matrix is particularly suitable in cases where two-component adhesives to be cured at room temperature or slightly elevated temperature are used. However, it may also be applied to other adhesives, for example, one-component, heat-curing, moisture-curing, oxygen-curing or anaerobic adhesives. In every case, the removal of the contamination can be made particularly effective where the adhesives are high-viscosity or hotmelt adhesives by the above-mentioned heating of the adhesive during application and/or introduction of the vibration energy.

Figure 1:
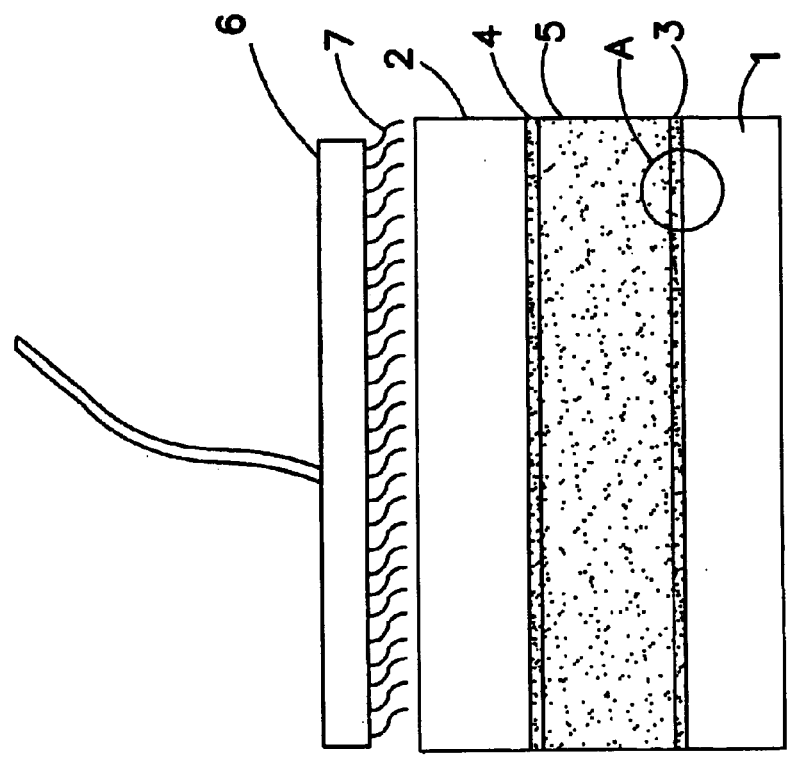
FIG. 1 shows the application of ultrasound or vibration via a sonotrode to substrates which have already been joined.

FIG. 1 shows the assembly formed by two substrates (1) and (2) and the adhesive (5) applied in between. The substrate contamination layers (3) and (4) are located at the interfaces between the adhesive matrix and the substrates. The sound head (6), which applies vibration energy or ultrasonic energy, is directly coupled with the substrate (2) via the coupling medium (7). In the most simple case, this coupling is achieved by directly fitting the sound head to the substrate so that there is no need for a special coupling medium (7) which is replaced by the direct mechanical contact.

As shown in FIG. 2 in the form of an enlarged view of detail A in FIG. 1, the diffusion of the contaminating components (3') and their dispersion/dissolution in the adhesive matrix are achieved by: the application of vibration energy, the contaminating components being diffused in the direction X into the adhesive matrix, so that the concentration of the contaminating components at the surface of the substrate (1) decreases dramatically after a short time.

Figure 3:
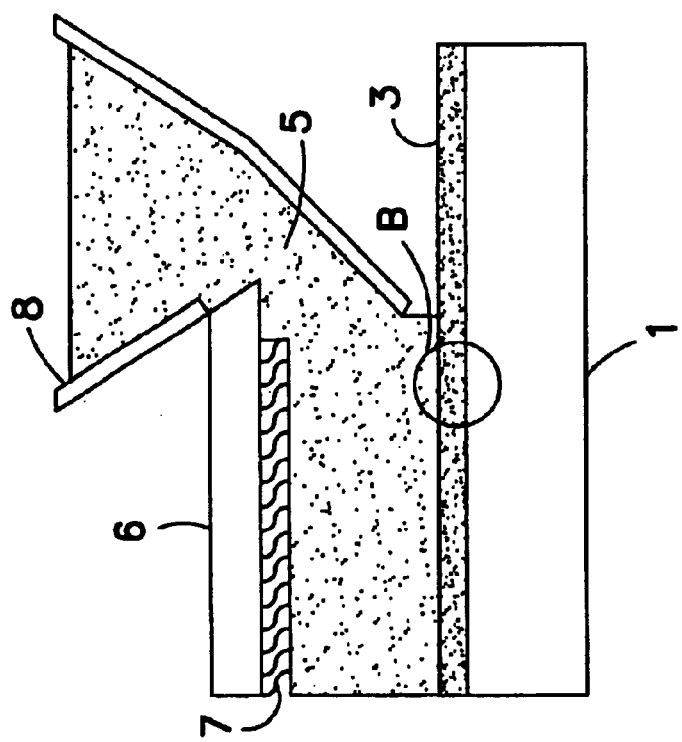
FIG. 3 shows the direct coupling of ultrasound/vibration with application of the adhesive to a substrate, the adhesive acting as the coupling medium.

FIG. 3 shows the coupling of the ultrasound/vibration energy with the application of adhesive to the substrate (1) covered by a layer (3) of contaminating components, the adhesive acting as the coupling medium. The coupling of the sound head (sonotrode) (6) with the applicator (8) for the adhesive is highly schematized in FIG. 3 which only shows the principle of action. Actual embodiments of such applicator/sonotrode couplings will be clearly apparent to the expert from this basic illustration.

Figure 4:
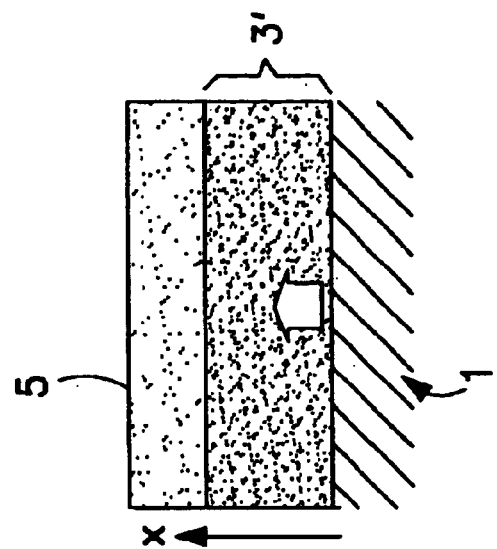
FIG. 4 is a detail view of the interface between the substrate surface and the adhesive strand applied thereto.

FIG. 4 is a detail view of the interface B between the substrate (1) with its contamination layer (3') and the applied strand (5) of adhesive. In this case, too, the diffusion gradient and the diffusion direction X of the contaminating components into the adhesive matrix are graphically illustrated.

The invention is further illustrated by the following Examples which are not meant to limit the scope of the invention in any way, but are merely intended to illustrate individual model embodiments and advantageous effects of the invention.

EXAMPLES

Example 1
Bonding of Oiled Steel Plates in the Automotive Sector (Assembly)

This example demonstrates that materials of different kinds used in car body assembly may be bonded using cold-curing contamination tolerant adhesives (no warpage of the components in the case of cold-curing systems) with little or need for expensive cleaning.

A strand of adhesive (TEROKALI 4520-34, a product of Henkel-Teroson) is automatically extruded onto the oiled steel plates under robot control. Coupled to the application nozzle, the pretreatment of the adhesive strand in accordance with the invention is carried out immediately after application of the adhesive by the sonotrode positioned directly behind the applicator. Typically, the adhesive/substrate interface is pretreated with ca. 20–100 watts, depending on the geometry and thickness of the adhesive strand and its application rate.

Carried out manually, the described procedure is particularly suitable for the repair sector.

The application of ultrasound may be carried out by a robot in conjunction with the application of the adhesive strand (in a single step). Alternatively or additionally, however, after the two substrates have been joined, the entire bonded joint may also be covered by the sonotrode using a robot and ultrasound thus introduced.

Example 2
Repair Applications in the Automotive/Aircraft Sector

In the repair of cars or even aircraft using adhesives, the work involved is carried out under workshop conditions where quality control is difficult. The old and contaminated plastic and metal surfaces inevitably encountered are difficult to prepare for repair work involving adhesives by cleaning and surface pretreatment processes. The use of contamination-tolerant adhesives (hot or even cold-curing) and the application of ultrasound can help to establish reliable bonds, even where the surfaces are contaminated.

Repair procedure (example): large, aged laminate surfaces are cleaned with solvents (ethanol, cleaning spirit) over the damaged area. The surface is then wet-abraded, for example with a SCOTCHBRITE pad, rinsed and dried. More elaborate surface pretreatment processes (for example, low-pressure plasma) are often impracticable. In addition, the abrading step is itself a suitable pretreatment for laminates with an epoxy resin matrix. It leads to breakages of the polymer chain and reactive polar surface groups and to a basically bondable substrate surface. However, this does presuppose contamination-free pretreatment. The influence of substrate contamination by residues and impurities that have diffused into the material cannot be estimated. According to the invention, therefore, the two-component adhesive (TEROKAL 5045, a product of Henkel-Teroson) intended for the repair work is applied to the laminate. The pretreatment of the substrate and the adhesive/substrate interface is carried out with a ca. 20 mm diameter sonotrode at an output of, typically, 20 to 100 watts. To this end, the surfaces to be bonded are traversed in a line or meander. The adhesive is used as the coupling medium with the interface. After the pretreatment according to the invention, the prepared repair patches are applied and fixed and the bonded joint is cured.

Example 3
Repair of Bonded-In-Place Windshields

In the replacement of windshields, damage through delamination often occurs during bonding. Windshield repairs involving adhesives are not carried out under controlled production conditions, but in workshops. Defective bonds are caused by contamination on the screen or the bodywork. By applying ultrasound, better wetting can be achieved which facilitates contamination-tolerant windshield bonding of better quality.

What is claimed is:

1. A process for bonding a first substrate surface to a second substrate surface wherein an adhesive is used to bond said first substrate surface and said second substrate surface and wherein at least one adhesion-reducing contaminate is present on at least one of said first substrate surface and said second substrate surface prior to bonding, said process comprising introducing vibration energy into the adhesive to remove at least a portion of said adhesion-reducing contaminate from at least one of said first substrate surface and said second substrate surface by dissolving or dispersing or both dissolving and dispersing said portion of said adhesion-reducing contaminate in said adhesive.

2. A process as claimed in claim 1, comprising the steps:
   a) applying said adhesive to said first substrate surface, wherein said at least one adhesion-reducing contaminate is present on said first substrate surface to form an adhesive-coated first substrate surface;
   b) applying said second substrate surface to the adhesive-coated first substrate surface;
   c) introducing vibration energy into the adhesive; and
   d) curing the adhesive.

3. A process as claimed in claim 1, wherein the adhesive is applied to one of said first substrate surface or second substrate surface while vibration energy is introduced.

4. A process as claimed in claim 1, wherein the vibration energy is ultrasound energy.

5. A process as claimed in claim 1, wherein the vibration energy is introduced by fitting a sound head (sonotrode) to at least one of said first substrate surface or said second substrate surface.

6. A process as claimed in claim 5, wherein the sound head is directly coupled with an adhesive applicator.

7. A process as claimed in claim 5, wherein the adhesive, first substrate surface and second substrate surface form a bonded joint and the sound head or a combination of said sound head and an adhesive applicator is guided by a machine along the bonded joint.

8. A process as claimed in claim 7, wherein said machine is a program-controlled robot.

9. A process as claimed in claim 1, wherein during the introduction of the vibration energy, the adhesive has a temperature above ambient temperature.

10. A process as claimed in claim 1, wherein during the introduction of the vibration energy, the adhesive has a temperature in the range from 25° C. to 90° C.

11. A process as claimed in claim 1, wherein during the introduction of the vibration energy, the adhesive has a temperature in the range from 35° C. to 70° C.

12. A process as claimed in claim 2, wherein during the application of the adhesive, the adhesive has a temperature above ambient temperature.

13. A process as claimed in claim 2, wherein during the application of the adhesive, the adhesive has a temperature in the range from 25° C. to 90° C.

14. A process as claimed in claim 2, wherein during the application of the adhesive, the adhesive has a temperature in the range from 35° C. to 70° C.

15. A process as claimed in claim 1, wherein the adhesive is a two-component adhesive which cures at room temperature or with the aid of heat.

16. A process as claimed in claim 1, wherein the adhesive is a one-component adhesive.

* * * * *